Patented May 25, 1937

2,081,835

UNITED STATES PATENT OFFICE 2,081,835

BLANC FIXÉ AND METHOD OF MAKING SAME

James B. Pierce, Jr., Charleston, W. Va., assignor to Barium Reduction Corporation, Charleston, W. Va., a corporation of Delaware No Drawing. Application May 5, 1932, Serial No. 609,551

7 Claims. (Cl. 134—58)

This invention relates to the manufacture of a precipitated barium sulphate and has for its particular objects the expeditious and economical production of an extremely fine precipitated barium sulphate the particles of which are coated with a protective colloid and in which the average particle size has a high co-efficient of uniformity, said product being peculiarly adapted as a reinforcing agent for rubber to which it imparts a considerably greater modulus of elasticity, tensil strength and elongation at break and resistance to abrasion and tear than the barium sulphate such as is commonly at present used for such rubber reinforcing purposes. Further objects of the invention are the provision of a process which precludes the formation of soluble salts in solution or suspension and eliminates the necessity for prolonged washing of the precipitated barium sulphate obtained, besides other advantages hereinafter set forth.

Heretofore in the production of barium sulphate, it has been customary to produce the same either by double decomposition from a soluble barium salt, such as barium chloride with sodium sulphate or barium sulphide liquor with sodium sulphate and, as a result of the double decomposition which occurs, it is necessary to separate the resultant soluble sodium salt and the precipitated barium sulphate either by filtration or by a prolonged decantation operation on a precipitate which is slow to settle. The average particle size of such prior precipitated barium sulphate, even when produced under the most favorable conditions, approximates about .225 micron and the co-efficient of uniformity thereof is but about 1.25, the same having a specific gravity at 24° C. of about 4.35.

My investigations have led to the discovery that it is possible to produce precipitated barium sulphate of low specific gravity, about 3.98 to 4.00 at 24° C., the particles of which are all spherical and uniform in shape and the average size of which will approximate but .20 micron or less, with a co-efficient of uniformity of 5.57, which uniformity is evidenced by the fact that when the particles are examined microscopically, using ultraviolet light and eye pieces having a magnification of 1,000 diameters with a magnification on the counting screen of 10,000, approximately 98% of the particles will measure .20 micron or less, some 1.7% will measure 1 micron or less and but 0.3% will measure from .2 to .3 micron.

In carrying out my invention, I preferably proceed as follows:—

To barium sulphide liquor at 70° to 80° C., containing approximately 15% to 22% BaS is slowly added with constant agitation approximately 1% to 2% of casein calculated on the weight of the BaS present. A substantial portion of the added casein will dissolve in the solution and the remainder will form a stable permanent emulsion.

The resultant barium sulphide liquor, containing the casein in solution and in suspension as an emulsion, is now added to or mixed with sulphuric acid—preferably of about 24% to 32% $H_2SO_4$ content—to completely precipitate the barium as $BaSO_4$ with liberation of hydrogen sulphide gas. During precipitation of barium sulphate in this manner, a great increase in volume of the mixture occurs, due to the formation by the $H_2S$ gas generated of very finely divided foam that serves to effectively disperse the barium sulphate as it is precipitated and thereby the adsorption of all of the dissolved and suspended casein is facilitated. After the foam subsides, the mixture is rendered slightly alkaline, preferably with barium hydroxide, and the entire mass, without subjecting the same to any filtration or decantation, is then dried on a suitable drier, such as a drum type of drier or vapor spray type of drier, whereupon the resultant dried product is disintegrated. If desired, the suspension of barium sulphate may be first filtered, but owing to the fact that the particles thereof are either impregnated with an adsorbed colloid, or are coated therewith, this product can be filtered only with difficulty, however, owing to the fact that the method employed by me results in no inorganic salts, other than the colloidal barium sulphate, being present in solution or suspension in the resultant slurry, as above stated, no filtration of the precipitated barium sulphate is necessary, nor is any washing thereof required since what $H_2S$ remains in solution, will be driven off when the slurry is dried on a drum drier or otherwise and hence my improved product can be produced without any increase in expense, as compared with the production of ordinary precipitated barium sulphate.

The $BaSO_4$, precipitated as above described in the presence of casein as a protective colloid or deflocculating or dispersing or retarding agent, has a much greater reinforcing value for rubber, when properly compounded therewith in the well known manner by incorporating the same with the rubber latex, than has ordinary $BaSO_4$ precipitated without the presence of casein and especially when specimens compounded with casein-precipitated blanc fixé and ordinary or straight precipitated blanc fixé are each aged in an air bomb, at 50% elongation for 18 hours at a temperature of 121° C. and under 100 lbs. of air pressure. Under these latter conditions, it has been ascertained that 30 parts by weight of BaSO₄, precipitated in the presence of casein, will impart a modulus of elasticity, tensile strength and elongation at break and have a resistance to tear and abrasion equal to that imparted by 60 parts of BaSO₄ precipitated without casein.

From the foregoing, it is apparent that my improved product is peculiarly adapted as a reinforcing agent for rubber, notwithstanding the relatively small quantity of casein which is employed in the manufacture thereof. Furthermore my improved barium sulphate, which has been precipitated in the presence of casein, imparts greatly superior aging qualities to unaged rubber stock as compared with ordinary barium sulphate not so precipitated, for example, on an equal weight basis of 40 parts of each such barium sulphates, unaged rubber stock with which my improved barium sulphate has been incorporated, will show, under the above test conditions, an increase of 25% in modulus of elasticity at 700% and 33% increase at 500% and also show an increase in tensile strength of 15%, with equal elongation at break as compared with unaged stock with which such ordinary barium sulphate, as above specified, has been incorporated. When 30 parts of my improved barium sulphate are compared with 40 parts of standard barium sulphate, insofar as the action thereof on unaged rubber stocks is concerned, it will be found that such improved barium sulphate will show an increase of approximately 10% in modulus of elasticity at 300%, 500% and 700% with equal tensile strength and elongation at break, when tested under the above specified conditions, as compared with the unaged rubber stock with which such ordinary barium sulphate has been incorporated.

It is obvious that 1% to 2% of casein based on the BaS content, as herein specified, is equal before complete adsorption, to approximately .5% to 1¾% based on the weight of the precipitated barium sulphate.

The specific surface of my improved barium sulphate (figured in square meters per gram) is approximately 8 square meters or even somewhat more, whereas that of standard or ordinary barium sulphate is less than 7 square meters.

I also may employ, in lieu of casein, substitutes therefor such as gelatin or corn starch, which latter is a hydrophilic, organic colloid of vegetable origin. yet I prefer to employ casein as the dispersing agent, since while barium sulphate prepared with other colloids yields almost equally as good compounding results with rubber as that of barium sulphate prepared with casein, the particle size of the latter barium sulphate is somewhat smaller and it has a greater specific surface than barium sulphate prepared with either of the other colloids.

While my improved product is described as being adapted for use in the manufacture of rubber, it is obviously adapted for all purposes wherein a light extremely finely divided barium sulphate having the characteristics herein set forth could be utilized to advantage.

The co-efficients of uniformity herein referred to are those calculated according to a Photomicrographic Method for the Determination of Particle Size of Paint and Rubber Pigments described by H. Green in the "Journal of the Franklin Institute", November 1921.

In standard barium sulphate, not precipitated with casein or an equivalent organic colloid of vegetable origin, such as corn starch, or of animal origin, such as gelatin, some 73.1% of the particles will measure .20 micron or less, 3.3% .10 micron or less and 99.7% .30 micron or less and .3% will range between .30 and .40 micron. Accordingly, by comparing these dimensions with those of my improved barium sulphate, it will be noted that not only is the average particle size held to smaller dimensions by the presence of casein, but there is greater uniformity of size as evidenced by the higher co-efficient of uniformity.

While I preferably employ casein as the dispersing or deflocculating agent, the same being what is known as an amphoteric glutinous colloid which is either acid or basic and which readily changes from one state to the other, I may also employ in lieu thereof gelatin which, while not amphoteric, is a glutinous organic colloid of animal origin.

While I preferably employ 1% to 2% of the dispersing agent casein, other amounts thereof within the scope of the appended claims may be employed without departing from the spirit of my invention. Furthermore, various other changes in the procedure of manufacture may also be made without departing from the spirit of my invention as claimed herein.

Having thus described my invention, what I claim and desire to obtain by United States Letters Patent is:—

1. The method of making precipitated barium sulphate, which comprises reacting upon barium sulphide liquor with sufficient sulphuric acid to effect the substantially complete precipitation of the barium as barium sulphate, such precipitation being accomplished in the presence in the reaction mix of a small amount, not less than 1% of the BaS content of such liquor, of an amphoteric colloidal dispersing agent of animal origin and then, without subjecting the same to a preliminary filtering operation, evaporating the liquid from the resultant slurry.

2. The method of making precipitated barium sulphate, which comprises reacting upon barium sulphide liquor, having a BaS content of from 15% to 22%, with at least its chemical equivalent of sulphuric acid having an H₂SO₄ content of from 24% to 32% and while maintaining the temperature of the mixture from 70° to 80° C., such reaction being accomplished in the presence in the reaction mix of a small percentage of a glutinous, organic, colloidal deflocculating agent.

3. The herein described product, comprising finely precipitated barium sulphate, containing a small percentage by weight of an adsorbed glutinous, organic colloid, said product being of considerably lower specific gravity than straight precipitated barium sulphate free from an organic glutinous colloid and the average particle size of such product being approximately 2/10 of a micron and the co-efficient of uniformity of particle size thereof being approximately 5.57.

4. The herein described product, comprising precipitated barium sulphate containing a small percentage of adsorbed casein, the same being characterized by its extremely small average particle size, the same not exceeding about 2/10 of a micron, and by its high co-efficient of uniformity of the particle size thereof, the same being in excess of 3, and such product being capable when compounded with rubber of very substantially increasing its modulus of elasticity and tensil strength above that imparted by the same amount of ordinary precipitated barium sulphate free from casein.

5. The herein described product, comprising precipitated barium sulphate containing a small quantity of adsorbed casein, the same being characterized by its extremely small average particle size, the same not exceeding 2/10 of a micron and the co-efficient of uniformity of particle size thereof exceeding 3.0 and being further characterized by the fact that it is substantially 100% more efficient as a rubber aging agent than the same amount of ordinary barium sulphate that has an average particle size of about .225 micron and an average co-efficient of uniformity of particle size of 1.25 and is free from an adsorbed glutinous organic colloid.

6. Method of preparing barium sulphate in the form of particles whose average size is extremely small and of a high co-efficient of uniformity and whose specific gravity is extremely low, which consists in reacting upon barium sulphide in solution with sulphuric acid in the presence of a very small amount, and not more than a few percent, of an organic colloidal retarding agent then, without subjecting the mixture to a filtering or washing operation, evaporating the liquid from the resultant slurry and recovering the resultant dried barium sulphate.

7. The herein described product, comprising precipitated barium sulphate containing a small quantity, and not more than a few percent of an adsorbed organic colloid, the same being characterized by its extremely small average particle size, the same not exceeding 2/10 of a micron, and the co-efficient of uniformity of particle size thereof exceeding 3.0 and being further characterized by the fact that it is substantially 100% more efficient as a rubber aging agent than the same amount of ordinary barium sulphate that has an average particle size of about .225 micron and an average co-efficient of uniformity of particle size of 1.25 and is free from an adsorbed organic colloid.

JAMES B. PIERCE, Jr.